United States Patent [19]

Prohaska

[11] 4,046,994

[45] Sept. 6, 1977

[54] CONTROL CARD RECEIVING AND SENSING ASSEMBLY

[75] Inventor: Raymond James Prohaska, Glen Cove, N.Y.

[73] Assignee: Unit Process Assemblies, Inc., Syosset, N.Y.

[21] Appl. No.: 631,376

[22] Filed: Nov. 12, 1975

[51] Int. Cl.² ............... G06K 7/06; H01H 43/08
[52] U.S. Cl. ............... 235/61.11 A; 200/46; 235/61.11 R; 340/149 A
[58] Field of Search ........... 235/61.11 R, 61.11 A, 235/61.7 B, 61.11 E; 200/46; 340/149 A; 250/568, 569; 194/4 R, 4 G

[56] References Cited

U.S. PATENT DOCUMENTS

| | | | |
|---|---|---|---|
| 3,200,240 | 8/1965 | Hammel | 235/61.11 A |
| 3,373,264 | 3/1968 | Damerau | 235/61.11 A |
| 3,433,932 | 3/1969 | Rolke | 235/61.11 A |
| 3,462,567 | 8/1969 | Brown | 200/46 |
| 3,567,911 | 3/1971 | Grundberg | 235/61.11 A |

*Primary Examiner*—Robert M. Kilgore
*Attorney, Agent, or Firm*—Robert E. Isner

[57] ABSTRACT

Control card receiving and sensing assembly including a fixed base plate, a generally U-shaped cover member mounted thereon and card entry defining means of a character such as to permit card insertion therebetween and removal therefrom only under conditions where essentially zero force is exerted on the card control surfaces.

10 Claims, 6 Drawing Figures

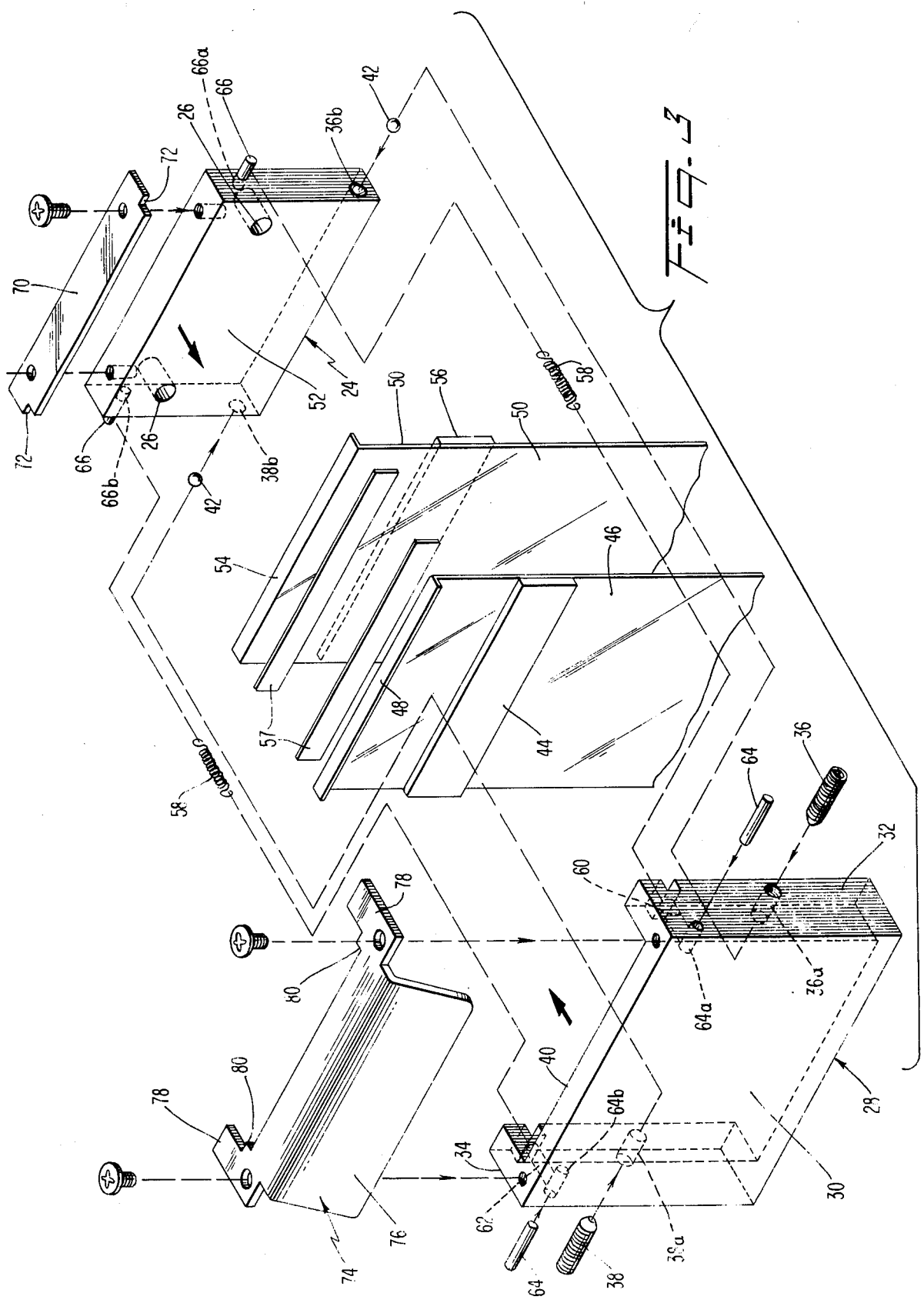

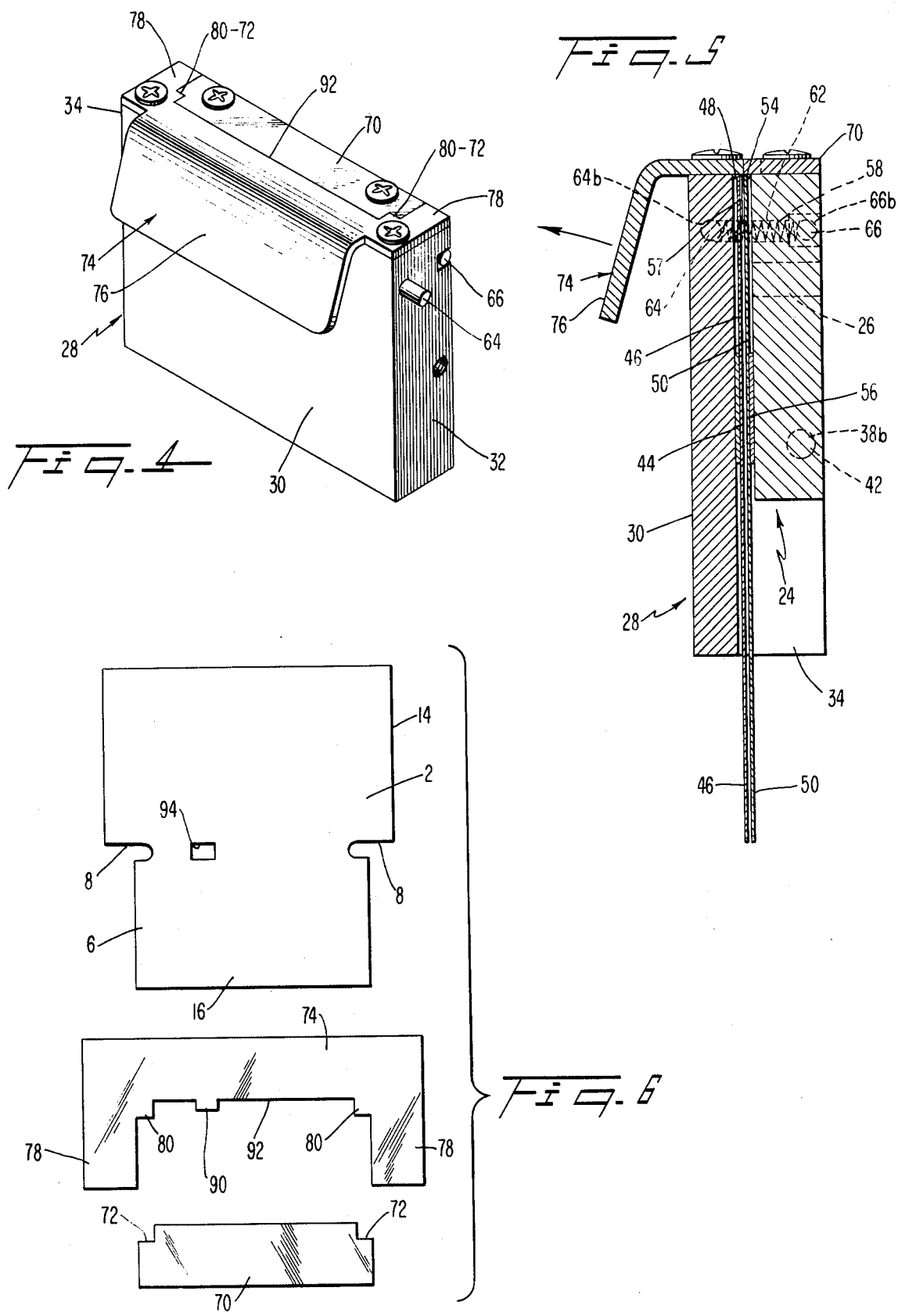

CONTROL CARD RECEIVING AND SENSING ASSEMBLY

This invention relates to an improved control card receiving and sensing assembly for data processing apparatus and particularly to an improved control card receiving and sensing assembly for plated control cards and the like for non-destructive thickness measuring apparatus.

Certain types of data processing apparatus employ control cards or similar insertable units having gold or other metal plated control indicia selectively positioned thereon. Repeated insertions and withdrawals of such plated control cards in conventionally constructed card receiving and sensing assemblies is normally characterized by undue wear and consequent deterioration of the plated surfaces thereof with attendant deleterious decrease in the definition of the intelligence represented thereby.

This invention may be briefly described as an improved control card receiving and sensing assembly that includes, in its broad aspects, a fixed base plate and a U-shaped cover member pivotally mounted thereon and card entry aperture defining means of a character such as to permit card insertion therebetween or removal therefrom only under conditions where essentially zero force is exerted on the control card surfaces. In its narrower aspects, the improved card receiving and sensing assembly includes auxiliary means that assure compressive complemental engagement between the control indicia on an inserted card and the sensing electrode components without sliding type contact therebetween.

Among the advantages of the subject invention is the provision of readily insertable control cards with zero insertion force operative thereon in association with automatic positioning of the control indicia thereon in complemental relation with sensing electrodes. Still other advantages include the provision of markedly reduced wear of plated control cards with consequent increased useful life thereof.

The object of this invention is the provision of an improved control card receiving and sensing assembly.

Other objects and advantages of the subject invention will become apparent from the following portions of this specification and from the appended drawings which illustrate, in accordance with the mandate of the patent statutes, the principles of the invention as incorporated in a presently preferred embodiment thereof.

FIG. 3 is an exploded perspective view of the components of a card receiving and sensing assembly incorporating the principles of this invention.

FIG. 4 is an oblique view of the displaceable cover member.

FIG. 5 is a side elevational view of the assembly in closed relation.

FIG. 6 is a schematic representation illustrative of the dimensional relationships between the components that are definitive of the control card entry aperture in the described assembly.

Figure 1:
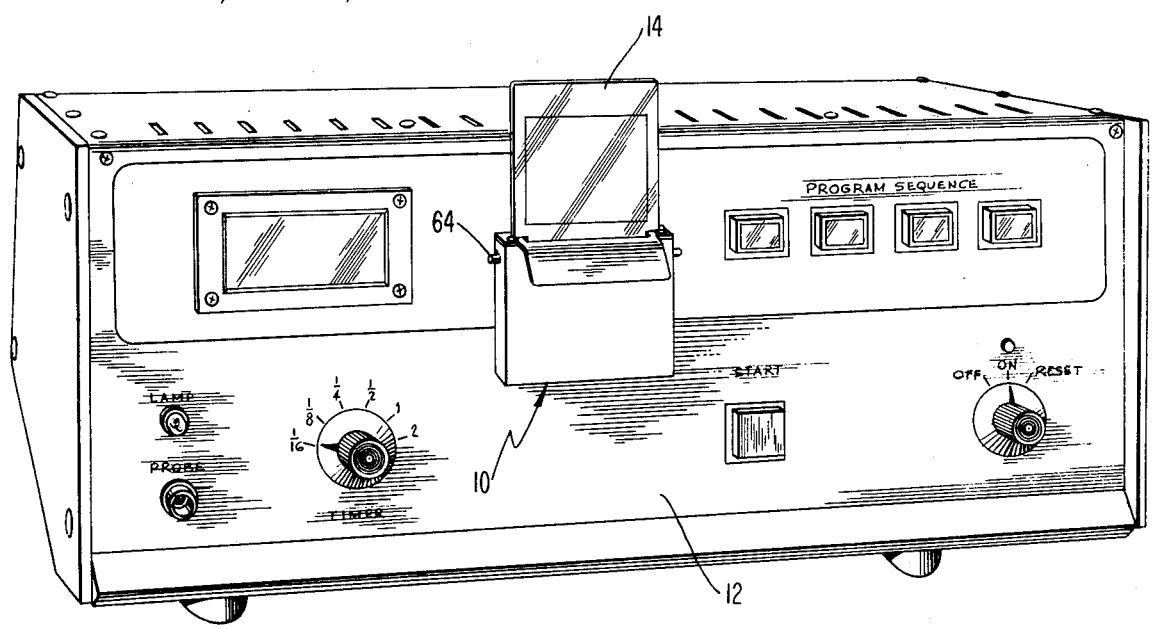
FIG. 1 is a schematic oblique view of the improved card reader as included in apparatus for measuring the thickness of thin films by application of beta radiation thereto.
Figure 2:
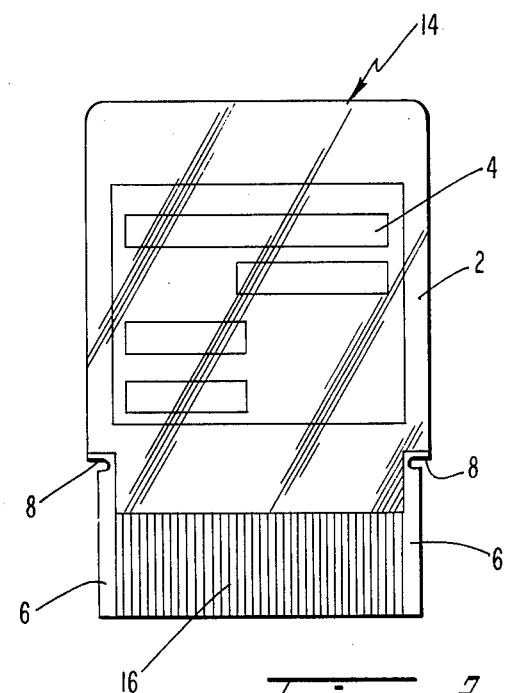
FIG. 2 is a side elevational view of a plated control card adapted for utilization in the system of FIG. 1.

Referring to the drawings, and initially to FIG. 1, an improved control card receiving and sensing assembly, generally designated 10, and incorporating the principles of this invention, is exemplarily illustrated as mounted upon the face of an automated instrument 12 for the non-destructive measurement of the thickness of thin platings and coatings on diverse parts, such as electronic components and the like, through utilization of so-called "beta back-scatter" techniques. In such an instrument, a selectively constituted control card, generally designated 14 and illustrated in elevation in FIG. 2, is adapted to contain all of the necessary intelligence or data for calibrating and presetting the associated internal measuring and control circuitry in accord with certain particular and required general characteristics of the type and nature of the coating and substrate material being subjected to measurement. As illustrated, such card may include a rectangular upper portion 2 having suitable identifying indicia 4 thereon, a lower portion 6 of reduced transverse dimension and a pair of locking notches 8 disposed therebetween. In the illustrated card, the lower portion 6 includes the necessary control data in the form of strips 16 conductive plating material thereon.

Referring now to FIG. 3, a preferred construction for the improved card receiving and sensing assembly incorporating the principles of this invention, and particularly dimensioned to accommodate the control card illustrated in FIG. 2, includes a rectangularly shaped base plate 24 adapted to be fixedly mounted on the face plate or other wall member of the data processing apparatus by means of screw type or other suitable fastening means (not shown) passing through the mounting bores 26. Operatively associated with the base plate 24 is a generally U-shaped displaceable cover member, generally designated 28, having a rectangular panel or face portion 30 and a pair of side wall portions 32 and 34 perpendicularly extending in parallel spaced relation from the marginal side edges thereof and spaced apart a transverse distance sufficient to closely contain the base plate 24 therebetween.

In assembled relation, the cover member 28 is pivotally mounted on and is rotatably displaceable relative to the base plate 24. Such pivotal mounting is conveniently effected by means of suitable pivot screws 36 and 38 adapted to be threadedly disposed within selectively located bores 36a and 38a in the side wall portions 32 and 34. The inwardly directed and extending terminal ends of the pins 36 and 38 are rotatably contained within the bores 36b and 38b in the dependent end of the base plate 24. Desirably, the portions of the pins 36 and 38 disposed within the bores 36b and 38b are smooth surfaced and, in order to minimize wear and consequent detrimental play, the ends thereof abut against balls 42 disposed at the end of the bores 36b and 38b. The bores 36a and 38a are preferably located at about the mid-length of the side walls 32, 34 and are spaced a predetermined distance from the inner face 40 of the panel portion 30 of the cover member 28, to accommodate the additional interposed structure as hereinafter described.

Mounted in abutting interfacial relation with the inner face 40 of the cover member 28 and displaceable in conjunction therewith is a flexible card sensing electrode element 46. Such flexible electrode element 46 is preferably constituted of a Mylar sheet having a plated sensing electrode pattern (not shown) on the card facing surface thereof complemental to that of the predetermined intelligence pattern 16 plated on the control card and positioned to operatively contact the indicia to be sensed on the control card 14 when the latter is properly seated in the reader assembly. Disposed on the rear face of the flexible electrode element 46 and positioned to extend over the control card engaging portion thereof is an elastomeric pressure pad 44, suitably silicone rubber, adapted to assure compressive interfacial engagement and good electrical contact between the plated intelligences 16 on the control card 14 and the complemental sensing electrode pattern on the flexible electrode element. The flexible electrode element further includes a terminal flange portion 48 adapted to overlay and be supported upon the upper defining edge of the panel portion 30 of the cover member 28. As shown, the electrode element 46 is of a transverse extent to be closely contained within the spaced side wall portions 32 and 34 thereof and is maintained in abutting relation with the inner face of the panel 30 by any suitable means.

Similar means such as the illustrated second flexible electrode element 50 having an electrode pattern complemental to that of the intelligence bearing portion 16 on the other facing surface of the card 12 and a selectively located elastomeric pressure pad 56 on the rear face thereof is mounted on the inner face 52 of the base plate 24. The second electrode element 50 is concomitantly provided with a terminal flange 54 that is adapted to overlay and be supported upon the upper surface of the base plate 24.

Mounted on the terminal end of the facing surfaces of the first and second electrode elements 46 and 50 are dust shield means 57 formed of soft and readily deformable material such as sponge neoprene or the like to minimize, if not preclude, entry of dust into the sensing components and to further assist and assure effectively zero insertion force operation of the assembly even with unskilled and careless operating personnel. Such dust shield means 57 also functions to maintain the electrode elements 46 and 50 in slightly spaced apart condition even when the cover member 28 is biased in its closed position.

In assembled relation, the cover member 28 and first electrode element 46 mounted thereon are adapted to be biased in a clockwise relation (as viewed from the lower right hand portion of FIG. 3) into abutting interfacial engagement with the second electrode element 50 mounted on the base plate 24 by the action of a pair of tensioned biasing springs 58. The springs 58 are desirably disposed within bores 60 and 62 in the side wall portions 32 and 34, respectively and are terminally connected to the cover member 28 and base plate 24 by suitable pins 64 and 66 disposed within the bores 64a and 66a and 64b and 66b in the side walls and base plate respectively.

Mounted on the upper surface of the assembled base plate 24 and second electrode element 50 as by screws (not shown) and effectively locking the flange 54 in position is a card receiving aperture defining plate 70 having relief notches 72 in the corners thereof. Adapted to overlay the upper surface of the cover member 28 and to effectively lock the flange 48 in position is a complemental handle member 74. The handle member 74 is suitably shaped to provide a projecting dependent finger engaging portion 76 and a pair of terminal extensions 78 transversely spaced apart a distance to closely accommodate the terminal end of the aperture defining plate 70 therebetween. The internally disposed corners of the handle member 74 include rectangular locking tabs 80 sized to be complementally containable by the notches 72 in the plate 70 when the cover member 28 and electrode 46 is biased into closed relation with the second electrode member 50 and base plate 24. The complementally sized notches 72 and locking tabs 80 operate to initially limit the transverse extent of the card receiving opening or slot when the cover member 28 is rotatably displaced in the counter clockwise direction (as viewed from the lower right hand portion of FIG. 3) and to thus preclude insertion of a control card intermediate the electrode 46 and card engaging member 50 until the cover member 18 has been rotatively displaced a sufficient amount as to permit vertical card insertion into the opening created thereby with zero insertion force, i.e., with minimal, if any, contact between the abutting surfaces on the control card and the facing surfaces of the electrode element and card engaging member.

As best shown in FIG. 6, the handle member 74 is provided with a projection 90 extending from its card engaging surface 92. Such projection is adapted to be received in closely spaced relation with a complementally sized and shaped aperture 94 in the control card 14 to insure proper positioning thereof relative to the operably intergageable elements required for the sensing of the intelligence contained thereon. As will be apparent to those skilled in this art, such projection 90 could equally well be incorporated as and extend from the aperture defining plate 70.

Having thus described my invention, I claim:

1. A card reader assembly for control cards having a metallic contact electrode pattern thereon and the like comprising a fixed rectangularly shaped base plate,
   a generally U-shaped displaceable cover member having a rectangular base portion and a pair of side wall portions perpendicularly extending in parallel relation from one face thereof and spaced to closely contain the base plate therebetween,
   means pivotally interconnecting the dependent end of said base plate with side wall portions of said cover member for pivotal displacement of said cover member relative to said base plate,
   means for biasing said base plate and cover member into abutting interfacial relation,
   sensing electrode elements mounted on the facing surfaces of said base plate and cover member and displaceable in conjunction therewith and selectively shaped card entry slot defining means disposed on the upper end of said cover member and said rectangularly shaped base plate contoured to permit card entry intermediate said card sensing electrode elements only when the latter are spaced apart a distance that permits card insertion therebetween without pressure contact on the electrode pattern surfaces thereof.

2. A card reader assembly as set forth in claim 1 including card locating means projecting from said cover member and receivable within a complementally sized aperture in a card member only when the electrode pattern portion of the latter is properly positioned for operative engagement with said card sensing electrode elements.

3. A card reader assembly as set forth in claim 1 including card locating means projecting from said rectangularly shaped base plate and receivable within a complementally sized aperture in a card member only when the electrode pattern portion of the latter is properly positioned for operative engagement with said card sensing electrode elements.

4. A card reader assembly as set forth in claim 1 including card locating means associated with said card entry slot defining means receivable within a complementally sized aperture in a card member only when the electrode pattern portion of the latter is properly positioned for operative engagement with said card sensing electrode elements.

5. A card reader assembly as set forth in claim 1 wherein said card sensing electrode elements comprise a flexible lamina having a predetermined sensing electrode pattern disposed on one surface thereof.

6. A card reader assembly as set forth in claim 5 including elastomeric means for compressively biasing said sensing electrode pattern into operative engagement with the electrode pattern portion of a card disposed in interfacial engagement therewith.

7. A card reader assembly as set forth in claim 1 including sealing means mounted on said base plate and cover member for closing the entry aperture defined by said card entry slot defining means when a card is not disposed intermediate said base plate and cover member.

8. A card reader assembly for control cards having a metallic contact electrode pattern thereon and the like comprising a fixed rectangularly shaped base plate having an aperture defining member mounted on the upper end thereof, a generally U-shaped displaceable cover member having a rectangular base portion and a pair of side wall portions perpendicularly extending in parallel relation from one face thereof and spaced to closely contain the base plate therebetween, means pivotally interconnecting the dependent end of said base plate with the side wall portions of said cover member for permitting pivotal displacement of said cover member relative to said base plate, a second aperture defining member mounted on the upper end of said cover member and cooperatively related with said aperture defining member mounted on said base plate to define a card entry receiving and positioning slot therebetween, means for biasing said base plate and cover member into abutting interfacial relation, and card sensing electrode elements mounted on the facing surfaces of said base plate and cover member and displaceable in conjunction therewith for selective engagement with the electrode pattern surfaces of a control card disposed therebetween when said control card is disposed in operative positioned engagement with said first and second apertures defining means.

9. A card reader assembly as set forth in claim 8 wherein said card sensing electrode elements comprise a flexible lamina having a predetermined sensing electrode pattern disposed on one surface thereof.

10. A card reader assembly as set forth in claim 9 including elastromeric means for compressively biasing said sensing electrode pattern into operative engagement with a card disposed in interfacial engagement therewith.

* * * * *